United States Patent [19]
Maccaferri

[11] 3,980,207
[45] Sept. 14, 1976

[54] PINCH ROLLERS

[76] Inventor: Mario Maccaferri, 24 Refield St., Rye, N.Y. 10580

[22] Filed: Dec. 19, 1974

[21] Appl. No.: 534,435

[52] U.S. Cl. ................................ 226/186; 226/191; 226/194
[51] Int. Cl.² .......................................... B65H 17/22
[58] Field of Search .......... 226/186, 181, 187, 190, 226/191, 192, 194; 242/55.19 R, 55.19 A, 55.18, 194

[56] References Cited
UNITED STATES PATENTS

| | | | |
|---|---|---|---|
| 2,715,024 | 8/1955 | Nydegger et al. | 226/191 |
| 2,804,300 | 8/1957 | Bilane | 226/191 |
| 3,537,661 | 11/1970 | Isom | 226/194 X |
| 3,659,797 | 5/1972 | Coy | 226/194 |

*Primary Examiner*—Allen N. Knowles
*Attorney, Agent, or Firm*—Philip Furgang

[57] ABSTRACT

Disclosed is a pinch roller for use in continuous magnetic tape cartridges. In one preferred embodiment, the pinch roller has an inner and out cylindrically shaped wall interconnected by a plurality of flexible U-shaped webs. Each wall has a flange extending radially from the mid-point of the axial length of the roller. These flanges are interconnected by U-shaped webs. The U-shaped webs extend above and below the mid-point in alternate and adjoining relationship so that the outer wall of the roller can move to an eccentric position with respect to the inner wall and/or permit the outer wall to align itself with the capstan should the cartridge be disposed with the principal axis of the roller at an angle to the capstan.

37 Claims, 17 Drawing Figures

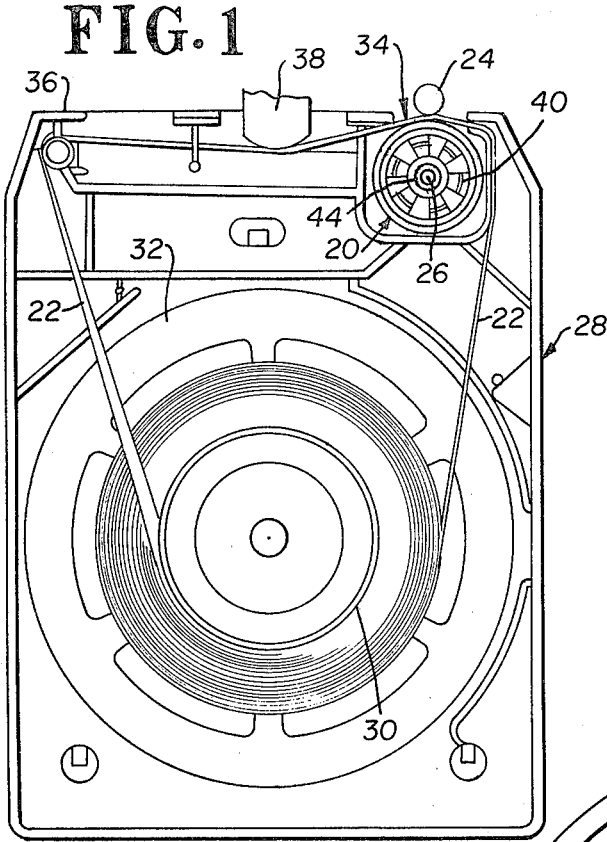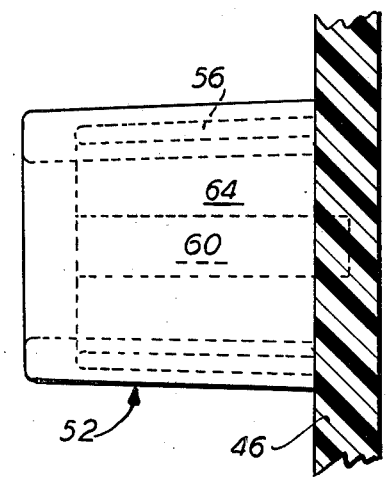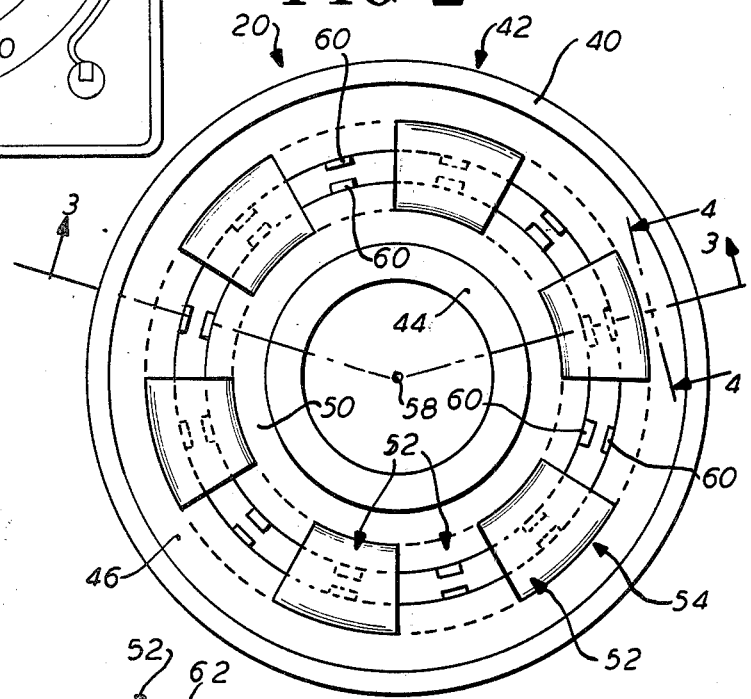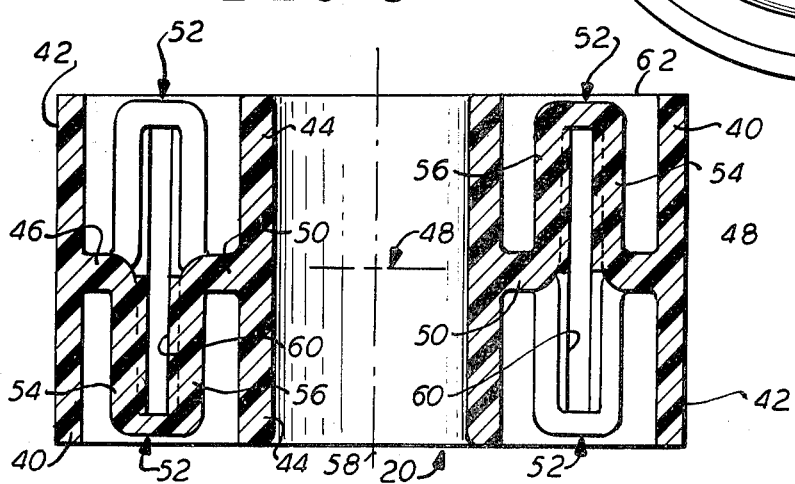

PINCH ROLLERS

BACKGROUND OF THE INVENTION

This invention relates to drive systems and, more particularly, to the longitudinal movement of magnetic tape or other web material by engaging the web between a pinch roller and capstan.

In moving such a web, particularly a continuous web of magnetic tape of the type used in connection with magnetic tape recording or reproduction apparatus, it is desirable that the tape be driven at a substantially uniform speed without slippage relative to the pinch roller and the capstan. Another desirable goal is that the pinch roller and capstan do not so distort the moving web as to either cause unequal movement or distortion of the moving web.

With particular reference to the continuous tape cartridge systems currently in use, the pinch roller responds to a driven capstan. Through this means, a continuous reel of tape is moved through the cartridge for either being recorded upon or having information played back therefrom. In view of the fact that the pinch roller is the sole means within a cartridge of moving the continuous tape, much attention has been directed at perfecting this means of movement.

Ideally, the contact area between the tape and capstan and tape and pinch roller should be defined by a line tangent to the cylindrical surfaces and coincident with the contact of the capstan and the pinch roller. This ideal situation is complicated by the fact that sufficient pressure must be had between the capstan and the roller to insure movement of the tape. Insufficient pressure can cause the tape to slip. Distortion in the tape engaging surface of the pinch roller can cause the tape material to be pulled at an irregular speed, or distorted. The result is speed distortion in the recording or playback of the information on the tape. Angulation of the pinch roller with respect to the capstan can be another source of slippage or damage of the tape. Since the speed of the tape is determined by the speed of the capstan and pinch roller, distortion in the surface area of the pinch roller under the force of the capstan obviously effects the speed at which the tape moves. The resultant distortion of the information emanating from the magnetic tape is often termed "wow" and "flutter." In addition, the movement of the tape is often measured by an indexing means in the player or recorder. The indexing means is usually responsive to the rotation of the capstan. Tape slippage will, therefore, result in inaccurate indexing.

Over the years, there have been a number of suggestions to overcome the above problems of moving the tape in a cartridge. Thus Kellogg (U.S. Pat. No. 2,276,494) suggests a web feeding apparatus in which the pinch roller comprises a conbination of elastable materials and a relatively inelastable materials. The yieldability of such materials, however, results in the distorted surface area of the roller, thereby causing slippage. Such a device is clearly not suitable for tape reproducing and recording equipment.

Auld (U.S. Pat. No. 3,482,792) suggests that the pinch roller of a cartridge may comprise a resilient rubber-like tire of uniform thickness mounted about a central hub. Such a device, however, bears much of the disadvantages of the aforementioned Kellogg device in that the surface yields and distorts in response to pressure from the capstan. Further, if the cartridge is inserted unevenly into the player so that the axis of the pinch roller is at an acute angle to the axis of the capstan, the tape will be gripped unevenly and, therefore, further slippage will be encountered. Thus, it will be seen that a rubber tire pinch roller introduces problems in the movement of a web. In addition, the tire tends to creep around the hub, thereby introducing moving discontinuities in the pressure roller. Also, the compliance or elasticity of the rubber material may change with age. The existence of hard spots in the rubber, which is well known, may show up as another source of unevenness or discontinuity. Rubber may also "cold set" and form a "flat" if left under pressure against the capstan for an extended time.

Thus, the surface characteristics of rubber is effected by heat and cold and is not as suitable as plastic materials for pinch rollers. The hardness of plastic surfaces and relative resistivity to distortion caused by heat or cold makes it a more desirable pinch roller material.

In an attempt to overcome the defects of rubber and use plastics, Isom (U.S. compliant No. 3,537,661) and Coy (U.S. Pat. No. 3,659,797) have each suggested an inner hub connected to an outer hub by a continuous radially extending web. In the device suggested by Isom, the web extends radially. In the device suggested by Coy, the web has a V cross-section with the apex of the V extending in the axial direction. The inventor suggests that this configuration provides for a more yieldable interconnection between the cylindrical outer wall and cylindrical hub. Both of these devices, however, suffer from several disadvantages. It is intended in both devices that the outer cylindrical wall be yieldable or distort in much the same manner as the rubber tire roller. These devices are generally made of plastic and the webs are intended to provide some flexibility or yieldability which, in many ways, simulates the rubber tire. Thus, it appears an object of both inventions to provide a compliant rim or outer cylindrical wall. However, it is in this very yielding of the wall which accounts for a certain creepage of the tape or distortion in the recording or reproduction of the information on the tape. Further, misalignment between the pinch roller and the capstan cannot be overcome by a mere radial yielding of the internal web. In effect, these devices are believed to merely simulate in plastic the overall effect of the rubber or resilient tire used in prior devices, and do not overcome the problem of slippage and distortion discussed above. What is more, they cannot accomodate an occasional misalignment of the axes of the capstan and pinch roller.

SUMMARY OF THE INVENTION

It is an object of this invention to provide an improved pinch roller of construction of economical manufacture which has vastly alleviated the aforementioned problems.

It is another object of this invention to eliminate the dependence upon a rubber tire pressure roller to propel a continuous magnetic tape held in a cartridge.

In accordance with the teachings of this invention, there is provided a pinch roller for moving a continuous web. The pinch roller comprises substantially cylindrical outer wall means for moving the web and substantially hollow inner wall means for acting as an axle. Means are provided for interconnecting the outer and inner walls means such that upon said roller receiving forces from the capstan, the outer wall is capable of moving to an eccentric position with respect to the inner wall.

In still another aspect of this invention, there is provided a pinch roller having inner and outer wall means. Means are provided for interconnecting the walls such that with the inner wall disposed at an angle other than 180 degrees with respect to the capstan, the outer wall means is capable of aligning itself parallel to the capstan and at the aforementioned angle with respect to the inner wall.

BRIEF DESCRIPTION OF THE DRAWING

FIG. 1 is a plan view of an endless tape cartridge with the top cover removed and equipped with a pinch roller constructed in accordance with the teachings of the present invention;

FIG. 2 is a top plan view of the pinch roller constructed in accordance with the teachings of this invention;

FIG. 3 is a sectional side view of the pinch roller of FIG. 2 taken along lines 2—2;

FIG. 4 is a partially sectioned view of a web of the pinch roller of FIG. 2 constructed in accordance with the teachings of the invention and taken along lines 4—4;

DESCRIPTION OF THE PREFERRED EMBODIMENTS

Figure 5:
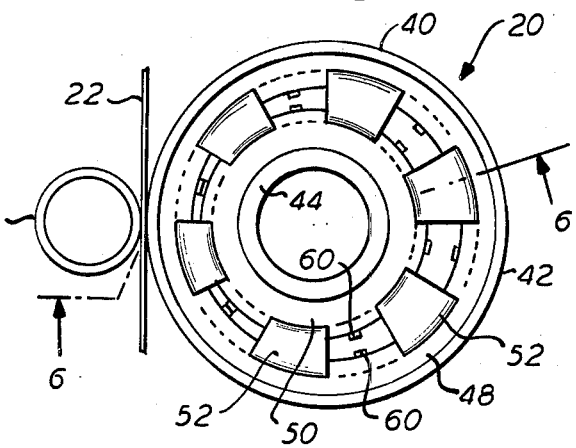
FIG. 5 is a pinch roller of FIG. 2 shown engaging a capstan and tape.
Figure 6:
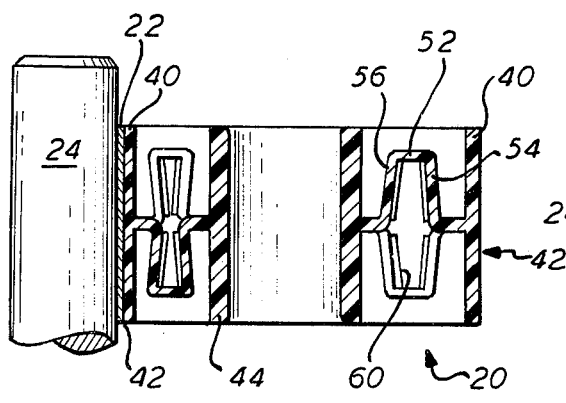
FIG. 6 is a sectional side view taken along lines 6—6 of FIG. 5.
Figure 7:
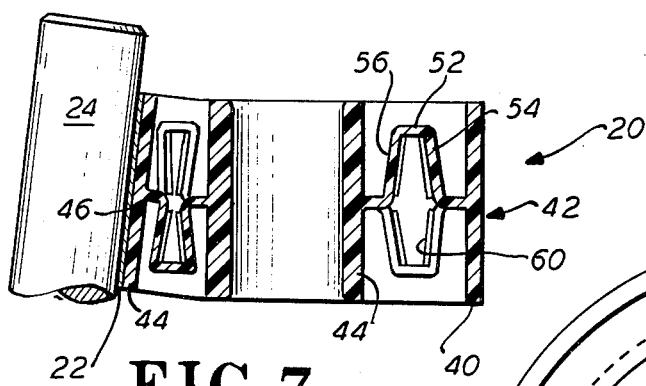
FIG. 7 is a second side view of the pinch roller of FIG. 2 disclosing an axial angulation between the pinch roller and the capstan.

Turning now to the drawing for purposes of illustration, the invention is embodied in a pinch roller of the form of a rotatable pressure roller 20 for exerting pressure on a tape 22 to hold the tape in driving contact with a capstan 24.

The pressure or pinch roller 20 may be mounted for rotation on a post 26 (FIG. 1) in a tape cartridge 28 of a type well known in the art. Such a cartridge 28 includes a hub 30 upon which is mounted an endless reel 32 of the magnetic tape 22 and is constructed in a manner well known in the art. The cartridge 28 has an opening 34 (FIG. 1) in a front wall 36 to admit the capstan 24. The capstan 24 is thereby able to engage the tape 22 and exert sufficient pressure against the tape 22 and roller 20 to drive the tape 22 past a sound transducing head 38 with the cartridge 28 in an operative playback or recording mode in a player or recorder respectively (not fully shown).

As previously indicated, in the prior art, the pinch roller was intended to have its outer cylindrical surface distorted by the pressure of the capstan thereagainst. In the case of elastomeric pinch rollers, there has been observed a tendency of the elastomeric material to creep about the post, thereby causing tape slippage, with resulting wow and flutter. Those pinch rollers that disclose an outer wall connected to an inner wall by a single web are formed of a semirigid material such as a plastic, and disclose deformation of the surface by a radial indentation at the line of contact of the capstan thereagainst. As with elastomeric rollers, it is believed that this type of identation results in a tendency to stretch the tape itself, resulting in slippage, and the consequent wow and flutter. In addition, if a cartridge is not installed directly in line with the capstan (i.e., if the axis of the capstan is not parallel with the axis of the roller) there is observed only a partial or uneven contact between the pinch roller and the tape. The result of this unequal pressure upon the tape is a further source of damage to the tape. One way of avoiding the aformentioned disadvantages is disclosed herein and may comprise the use of a plurality of individual web sections which join the outer and inner walls of the pinch roller. In a preferred embodiment (FIGS. 1 – 7) there is provided the pinch roller 20 which may comprise an outer wall 40. The outer wall 40 may take the shape of a hollow cylinder and provide a tape engaging surface 42. The roller 20 may also have an inner cylindrically shaped wall 44. The inner cylindrical wall 44 is intended to admit therewithin the post 26 (FIG. 1) and be rotable thereabout.

Extending radially inwardly from the outer wall 40 is a flange 46. The flange 46 may be disposed at the center 48 of the axial length of the outer wall 44. Extending radially outwardly from the inner wall 44 and spaced from the first flange 46 may be a second flange 50. Interconnecting these two flanges 46 and 50 disposed radially about the roller 20 may be a plurality of webs 52. Each web 52 may be substantially U-shaped in the radial direction with the legs 54 and 56 of each U-shaped web 52 extending substantially parallel the principal axis 58. The webs 52 may preferrably alternate with the legs 54 and 56 of alternate webs extending axially in opposite directions from each other, above and below the center 48 of the axial length. The purpose for the alternate mid-point disposition of the webs 52 will be more fully discussed hereinafter.

Each web 52 has, as previously indicated, a generally U-shaped cross-section extending in the radial direction of the roller 20. Each web 52, in addition, defines a substantial portion of a sector of a circle.

Within each U-shaped web 52 and on the opposed sides of the legs 54 and 56 may be stops 60. Each pair of opposed stops 60 are in registry with one another. The function of these stops 60 will be more fully discussed hereinafter. It should be noted, however, that these stops 60 may take any desirable shape. Thus, they may be substantially rectangular and project inwardly of the U-shaped members occupying a fraction of the arcuate length of the overall web 52.

In one preferred embodiment, for example, the pinch roller may be molded of, for example, an acetal plastic. The outer diameter of the pinch roller 20 may have an approximate measurement of 0.850 of an inch. The outer wall 40 may have, for example, a thickness of approximately 0.035 of an inch. The axial length of the pinch roller 20 may extend approximately 0.459 of an inch. The upper or lowermost portions of the U-shaped webs 52 extend within 0.007 of an inch of the top 62 or bottom 64 of the pinch roller 20. The tape engaging surface 42 may be provided with a mat finish to encourage good gripping characteristics. The inner wall 44 of the pinch roller 20 may have an internal diameter of 0.260 of an inch so as to accommodate a post 26 ordinarily used in cartridges 28.

In use, it will be apparent that the pinch roller 20 is disposed so that in a quiescent condition (with no forces applied) the inner wall 44 is concentric with the outer wall 40. Upon insertion into a player (not fully shown), the engaging capstan 24 presses the tape 22 against the pinch roller 20 (FIG. 3). In ordinary operation of prior art pinch rollers, the outer wall is distorted, thereby resulting in extending the travel of the tape passed the capstan. The result is wow, flutter, and poor indexing due to the slippage or stretching of the tape as it passes through the player (or recorder). In the present invention, it will be observed that the pressure of the capstan 24 against the tape 22 and the outer wall 42 of the roller 20 causes the roller to move flexibly with the outer wall 42 moving to an eccentric position (FIGS. 5 and 6) with respect to the inner wall 44. Thus, the outer wall 40 maintains a substantially purely cylindrical surface which engages the capstan 24 and tape 22 along a line of tangency, thereby maintaining a minimal contact area between the capstan 24, tape 22, and the pinch roller 20. It will be observed that, as the pinch roller 20 turns, the interlocking webs 52 prevent the outer wall 40 from either rotating with respect to inner wall 44 (as is most experienced in elastomeric rollers) or otherwise distorting as is common to all prior art rollers. In addition, the stops 60 serve a useful purpose by cushioning excessive closing impact of the sides or legs 54 and 56 of the U-shaped webs 52.

Still another important aspect of this invention is observed when a cartridge 28 is inserted into a player such that the angle of the post 26 holding the pressure roller 20 forms an acute angle with the capstan 24. In the prior art devices, such an arrangement resulted in the roller engaging only a portion of the capstan 24 and tape 22, thereby resulting in irregular or uneven pressure against the tape 22. This uneven pressure is believed to result in damage to the tape. This disadvantage has been overcome by virtue of the plurality of webs 52 of the pinch roller 20. As shown (in exaggerated form in FIG. 7), the outer wall 42 can pivot at the flange 46 so that the roller 20 may rotate with the post 26 at an acute angle to the capstan 24. The separate webs 52 and flange 46 permit the roller 20 to appropriately adjust along its line of contact to the cylindrical tape engaging surface 42. This is assisted by the alternating disposition of adjacent webs 52. There is thus maintained with the pinch roller 20 provided herein, a constant tangency of the outer wall 40 tape engaging surface 42 of the pinch roller 20 with the tape 22 and capstan 24.

(In other embodiments, similar repeated reference characters denote similarly disclosed features of this invention.)

Figure 8:
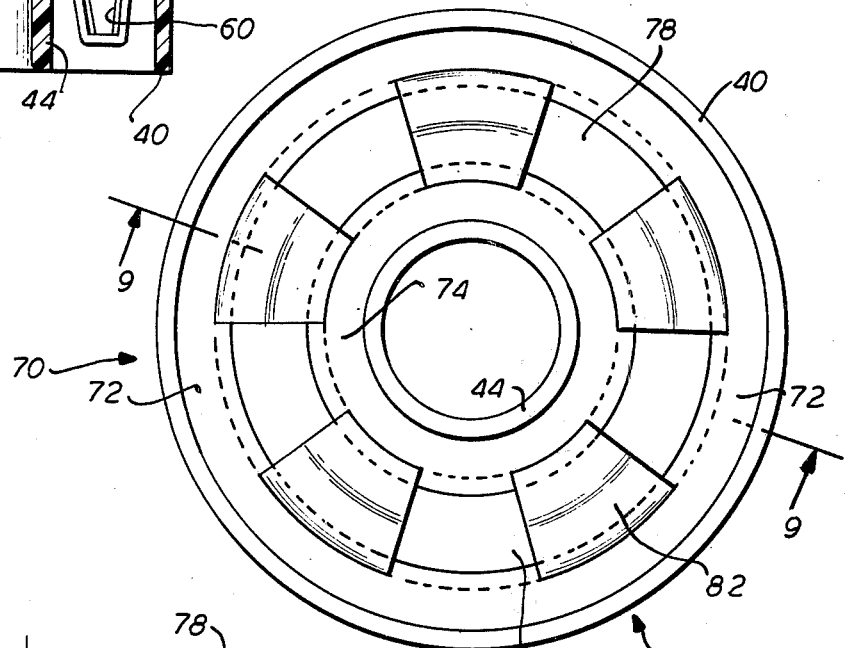
FIG. 8 shows a top plan view of another pinch roller constructed in accordance with the teachings of this invention.
Figure 9:
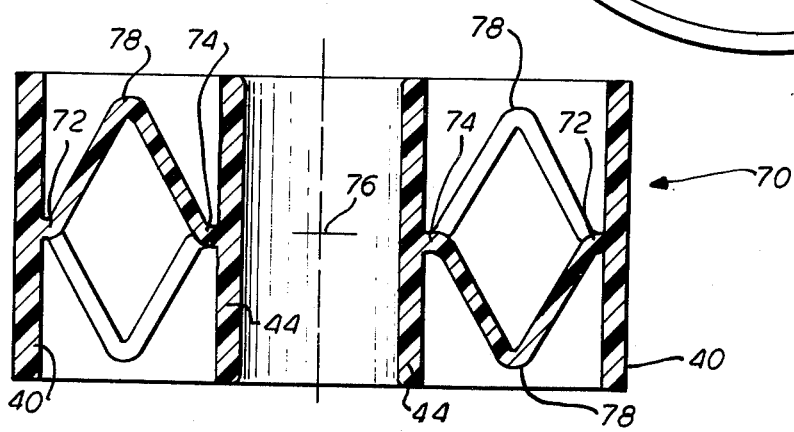
FIG. 9 discloses a side sectional view of the pinch roller of FIG. 8 taken along lines 9—9.

In still another embodiment of this invention, (FIGS. 8 and 9) there is shown a pinch roller 70 having an outer wall 40 and an inner wall 44. Radially extending flanges 72 and 74 may be formed, as in the first—mentioned device, as an integral part of the walls 40 and 44, respectively. The flanges 72 and 74 may be located at the center 76 of the axial length of the roller 70. V-shaped webs 78 are disposed in an alternating fashion and interconnecting the outer wall flange 72 with the inner wall flange 74 in much the same was as the webs 52 of the pinch roller 20 of FIGS. 1 – 7. In the same manner as the first disclosed pinch roller 20, the webs 78 form sectors of a circle, therby lending strength to the web formation itself and the roller 70. The operation of this pinch roller 70 is similar to that of the first pinch roller 20. The V-shaped webs permit greater radial movement of the outer wall 40 with respect to the inner wall 44. Any number of alternating webs 78 may be provided with ten webs being preferrable.

Figure 10:
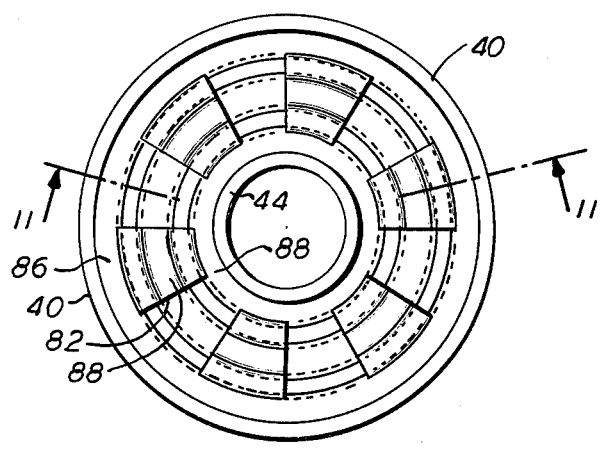
FIG. 10 shows a top view of still another pinch roller constructed in accordance with the teachings of this invention.
Figure 11:
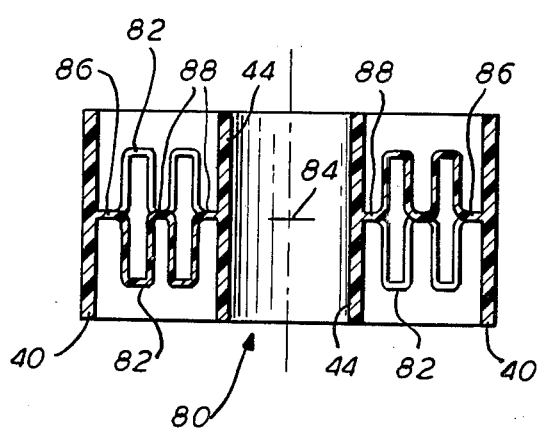
FIG. 11 is a side sectional view of the pinch roller of FIG. 10 taken along lines 11—11.

Turning to still another embodiment, there is provided a pinch roller 80 (FIGS. 10 and 11) in which the outer wall 40 is connected to the inner wall 44 by substantially W or M-shaped webs 82. The advantage of a W-shaped web 82 is to provide greater resiliency or flexibility. As with the previous pinch rollers 20 and 70, the webs 82 alternate with one another and are connected at the mid-point 84 of the axial length of the pinch roller. The pinch roller 80 comprises as many as twelve alternating webs. The outer and inner walls 40 and 44 have extending therefrom, at the median 84 and spaced from each other, radially extending flanges 86 and 88, respectively. The W and alternate M webs 82 are secured to the radially extending flanges 82 and 86 and the respective ends. Each web 82 meets at the center forming a common, annular, flange 88. As discussed with other webs herein, each forms in the top or radial end view (FIG. 10) a sector of a circle.

Figure 12:
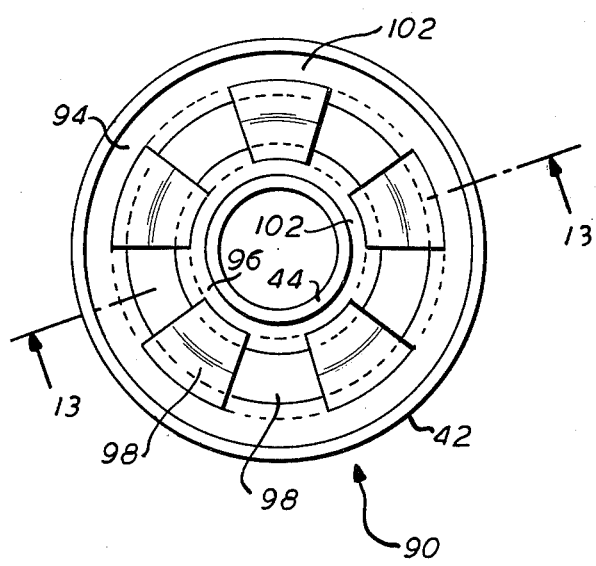
FIG. 12 is a top view of still another pinch roller constructed in accordance with the teachings of this invention.
Figure 13:
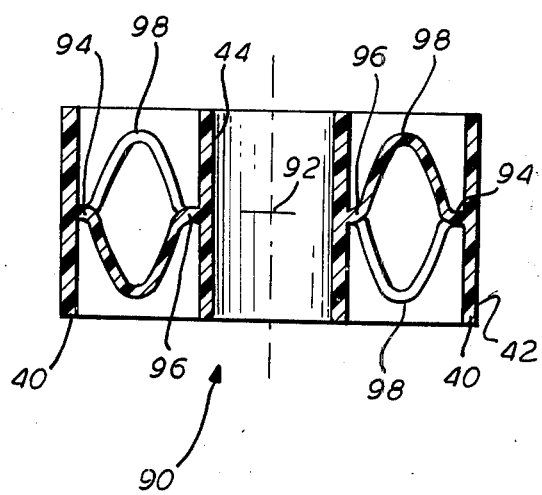
FIG. 13 is a side sectional view of the pinch roller of FIG. 12 taken along lines 12—12.
Figure 14:
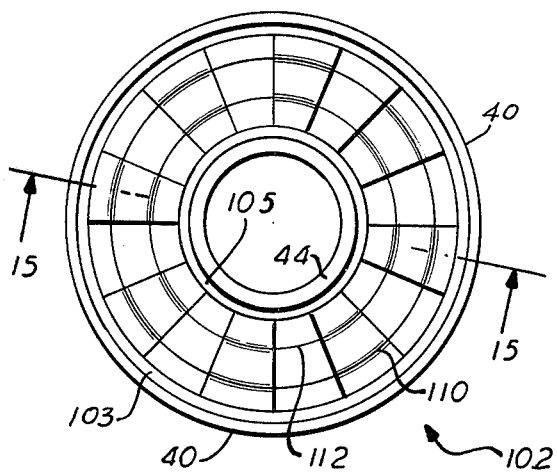
FIG. 14 is a top view of still a further pinch roller constructed in accordance with the teachings of this invention.
Figure 15:
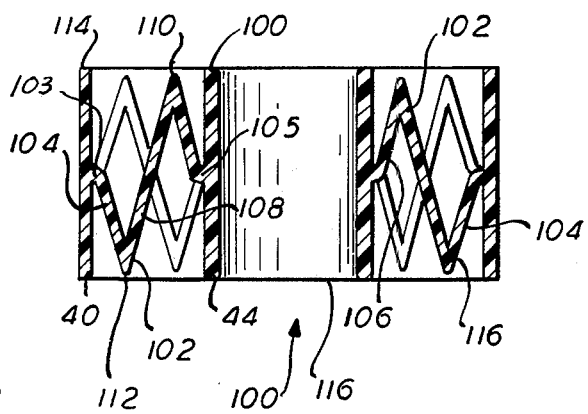
FIG. 15 is a side sectional view of the pinch roller of FIG. 14 taken along lines 15—15.

Still another embodiment is a pinch roller 90 (FIGS. 12 and 13) in which the outer and inner walls 40 and 44 have secured thereto and extending radially at substantially the mid-point 92 of the axial length of the roller 90, flanges 94 and 96, respectively. The flanges 94 and 96 are spaced from one another and joined by webs 98 which, as previously discussed, alternate in an axial direction, above and below the mid-point 92. Each web 98 has a substantially semielliptical cross-section. As with the prior webs, each forms a sector of a circle in the top view (FIG. 12), thereby lending strength to the interconnection between the outer and the inner walls 40 and 44.

In still a further embodiment, there is provided a pinch roller 100 having outer and inner walls 40 and 44 interconnected by N-shaped webs 102. The exterior legs 104 and 106 of the N-shaped webs 102 extend at an acute angle with respect to the walls 40 and 44 respectively and are secured at the mid-point of the walls 40 and 44 to radially extending flanges 103 and 105, respectively. The interconnecting leg 108 also extends at an angle between the legs 104 and 106. Thus, the webs 102 form an accordion pleat which is flexible upon pressure from the capstan (not shown). In this instance, the webs 102 are spaced in alternating sequence as on the aforementioned pinch rollers.

Figure 16:
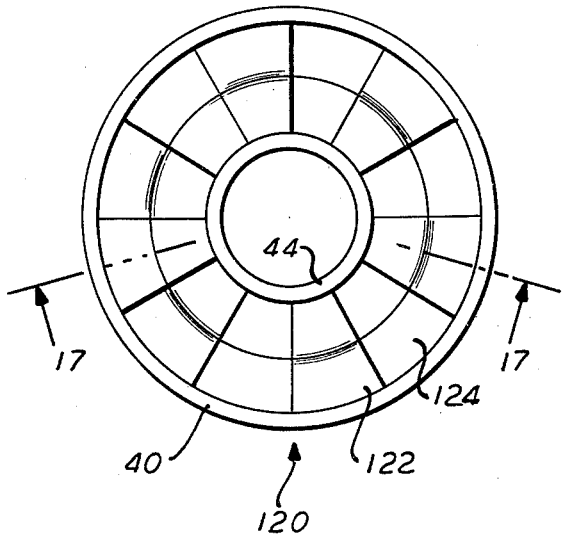
FIG. 16 is a top view of still a further pinch roller constructed in accordance with the teachings of this invention.
Figure 17:
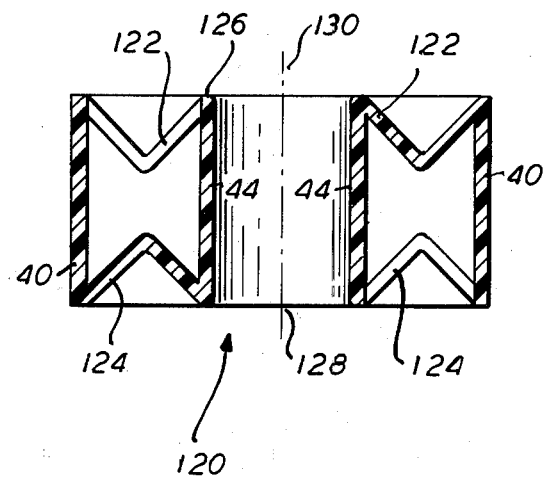
FIG. 17 is a side sectional view of the pinch roller of FIG. 16 taken along lines 17—17.

In still an additional embodiment of this invention there is provided a pinch roller 120 (FIGS. 16 and 17)

which comprises outer and inner walls 40 and 44, respectively. Interconnecting these walls are a plurality of upper and lower webs 122 and 124, respectively, spaced in an alternating pattern. The upper and lower webs 122 and 124 are substantially V-shaped and the apices extended inwardly from the top or bottom 126 or 128, respectively, of the pinch roller 120. As with previously discussed webs, each web defines in the top view (FIG. 16) or bottom view (not shown) sectors of a circle. The alternating configuration permits the roller 120 to flex inwardly of the inner wall 40 and, if necessary, at an angle to the principal axis 130.

It is understood that the pinch rollers herein can be made of any flexible material such as an acetal plastic suitable for molding.

What is claimed is:

1. A pinch roller for moving a continuous web of the type which is placed in communication with a capstan, said roller comprising:
   a. substantially hollow and cylindrical outer wall means for moving the web;
   b. substantially hollow and cylindrical inner wall means for acting as an axle; said inner wall being, in a quiescent condition, substantially concentric with said outer wall; and
   c. annular means, uniformly flexible throughout its circumference, interconnecting said inner and outer walls, such that, upon said roller receiving forces from the capstan, said outer wall being capable of moving to an eccentric position with respect to said inner wall.

2. A pinch roller as recited in claim 1 wherein with the principal axis of said inner wall being disposed at an angle other than 180° with respect to the capstan, said outer wall upon communicating with said capstan is capable of aligning itself parallel thereto and at said angle with respect to said inner wall at the line of communication with the capstan thereby being capable of moving the web uniformly between said outer wall and the capstan.

3. A pinch roller as recited in claim 2 wherein said interconnecting means comprises a plurality of webs each extending radially.

4. A pinch roller as recited in claim 3 wherein said webs being flexible so as to move, in response to forces upon said outer wall, to permit said outer wall to move to an eccentric position with respect to said inner wall and return said outer wall to said concentric position upon removal of said forces.

5. A pinch roller as recited in claim 4 wherein each of said webs having substantially U cross sectional shape, said U extending substantially parallel said principal axis.

6. A pinch roller as recited in claim 5 wherein said interconnecting means further comprises stop means disposed between said U shaped legs so as to thereby cushion the contact between said legs of said U upon compression of said webs in response to said forces upon said outer wall.

7. A pinch roller as recited in claim 6 wherein said interconnecting means further comprises each of said walls having a flange extending therefrom in a radial direction and toward one another and having an arcuate configuration, said webs interconnecting said flanges.

8. A pinch roller as recited in claim 7 wherein said flanges being disposed substantially at the mid-point of the axial length of said roller, said webs extending above and below said mid-point in adjoining alternating relationship with respect to one another about said roller.

9. A pinch roller as recited in claim 8 wherein said webs each define in the radial direction, with respect to said principal axis, a sector of a circle.

10. A pinch roller as recited in claim 9 wherein said stop means comprises boss like extensions from said legs of said U webs disposed in registry with one another to thereby limit the eccentric or angular displacement of said outer wall with respect to said inner wall.

11. A pinch roller as reflected in claim 10 wherein said webs define in the radial direction, with respect to said principal axis, sectors of a circle.

12. A pinch roller as recited in claim 11 wherein said roller is molded of an acetal plastic for use in continuous tape cartridges.

13. A pinch roller as recited in claim 4 wherein each of said webs having a substantially V cross sectional shape, the apices of V extending substantially parallel said principal axis.

14. A pinch roller as recited in claim 13 wherein said interconnecting means further comprises each of said walls having a flange extending therefrom in a radial direction and toward one another and having an arcuate configuration, said webs interconnecting said flanges.

15. A pinch roller as recited in claim 14 wherein said flanges being disposed substantially at the mid-point of the axial length of said rollers, said webs extending above and below said mid-point in adjoining alternating relationship with respect to one another about said roller.

16. A pinch roller as recited in claim 15 wherein said webs each define in the radial direction, with respect to said principal axis, sectors of a circle.

17. a pinch roller as recited in claim 16 wherein said roller is molded of an acetal plastic for use in continuous tape cartridges.

18. A pinch roller as recited in claim 4 wherein each of said webs having a substantially M cross sectional shape the outer and inner legs of each of said M webs extending substantially parallel said principal axis.

19. A pinch roller as recited in claim 18 wherein said interconnecting means further comprises each of said walls having a flange extending therefrom in a radial direction and toward one another and having an arcuate configuration, said webs interconnecting said flanges.

20. A pinch roller as recited in claim 19 wherein said flanges being disposed substantially at the mid-point of the axial length of said roller, said webs extending above and below said mid-point in adjoining alternating relationship, the two internal legs of said M webs of each adjacent web joining at a common mid-point thereby forming ring shaped flanges disposed between said two wall flanges.

21. A pinch roller as recited in claim 20 wherein said webs each define in the radial direction, with respect to said principal axis, sectors of a circle.

22. A pinch roller as recited in claim 21 wherein said roller being molded of an acetal plastic for use in continuous tape cartridges.

23. A pinch roller as recited in claim 4 wherein each of said webs having a substantial semielliptical cross sectional shape with the major diameter of each of said semielliptical being disposed parallel said principal axis.

24. A pinch roller as recited in claim 23 wherein said interconnecting means further comprises each of said walls having a flange extending therefrom in a radial direction and toward one another and having an arcuate configuration, said webs interconecting said flanges.

25. A pinch roller as recited in claim 24 wherein said flanges being disposed substantially at the mid-point of the axial length of said roller, said webs extending alternately above and below said mid-point in alternating relationship with respect to one another about said roller.

26. Pinch roller as recited in claim 25 wherein said webs each define in the radial direction, with respect to said principal axis, sectors of a circle.

27. A pinch roller as recited in claim 26 wherein said roller being molded of a acetal plastic for use in a continuous tape cartridge.

28. A pinch roller as recited in claim 4 wherein each of said webs having a substantially N cross-sectional shape each of said N legs extending at an acute angle with respect to said principal axis of said roller.

29. A pinch roller as recited in claim 28 wherein said interconnecting means further comprises each of said walls having a flange extending therefrom in a radial direction and toward one another and having an arcuate configuration, said webs interconnecting said flanges.

30. A pinch roller as recited in claim 29 wherein said flanges being disposed substantially at the mid-point of the axial length of said roller, said webs extending alternately such that said legs of said N-webs define circumferentially in radial planes flexure lines which are disposed above and below said mid-point of said axial length.

31. A pinch roller as recited in claim 30 wherein each of said webs define in the radial direction, with respect to said principal axis, a sector of a circle.

32. A pinch roller as recited in claim 31 wherein said roller being molded of an acetal plastic for use in a continuous tape cartridge.

33. A pinch roller as recited in claim 12 wherein the free ends of each of said V's are secured to the marginal edges of said inner and outer walls.

34. A pinch roller as recited in claim 33 wherein said webs are alternately secured to the top and bottom radial ends of said walls such that said webs in the radial direction define sectors of a circle and alternate with one another, every other web being secured at its free ends to the bottom radially extending end of said walls and every other web disposed therebetween secured at its free ends to the top radially extending ends of said walls.

35. A pinch roller as recited in claim 34 wherein said apices are spaced from the mid-point of the axial length of said roller and within said walls.

36. A pinch roller as recited in claim 35 wherein said roller being molded of a plastic material for use in a continuous tape cartridge.

37. A pinch roller for moving a continuous web of the type which is placed in a communication with a capstan, said roller comprising:
  a. substantially hollow cylindrical outer wall means for moving the web;
  b. substantially hollow cylindrical inner wall means for acting as an axle; and
  c. annular means, uniformly flexible throughout its circumference, interconnecting said inner and outer walls, such that, with the inner wall being disposed at an angle other than 180° with respect to the capstan, said outer wall, upon communicating with said capstan, is capable of aligning itself parallel thereto and at said angle with respect to said inner wall at the line of communication with the capstan, thereby being capable of moving the web uniformly between said outer wall and the capstan.

* * * * *